(12) United States Patent
Fukuyama et al.

(10) Patent No.: US 11,073,378 B2
(45) Date of Patent: Jul. 27, 2021

(54) CLEARANCE MEASUREMENT DEVICE, CLEARANCE MEASUREMENT SENSOR, AND CLEARANCE MEASUREMENT METHOD

(71) Applicant: MITSUBISHI HEAVY INDUSTRIES, LTD., Tokyo (JP)

(72) Inventors: Misaki Fukuyama, Tokyo (JP); Akio Kondou, Tokyo (JP); Tomoyuki Onishi, Tokyo (JP); Takahiro Miyamoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/606,047

(22) PCT Filed: Apr. 24, 2018

(86) PCT No.: PCT/JP2018/016574
§ 371 (c)(1),
(2) Date: Oct. 17, 2019

(87) PCT Pub. No.: WO2018/199076
PCT Pub. Date: Nov. 1, 2018

(65) Prior Publication Data
US 2020/0041254 A1 Feb. 6, 2020

(30) Foreign Application Priority Data
Apr. 25, 2017 (JP) .............................. JP2017-086222

(51) Int. Cl.
*G01B 11/14* (2006.01)
*G01B 11/02* (2006.01)

(52) U.S. Cl.
CPC ............ *G01B 11/14* (2013.01); *G01B 11/026* (2013.01)

(58) Field of Classification Search
CPC ....... G01B 11/14; G01B 11/026; F01D 11/14; F01D 11/20; F01D 21/003;
(Continued)

(56) References Cited

U.S. PATENT DOCUMENTS

| 4,766,323 A | 8/1988 | Franklin et al. |
| 2010/0080500 A1* | 4/2010 | Zheng ................... G01B 11/14 385/12 |

(Continued)

FOREIGN PATENT DOCUMENTS

| CN | 103438814 | 12/2013 |
| CN | 104501728 | 4/2015 |

(Continued)

OTHER PUBLICATIONS

International Search Report dated Jul. 17, 2018 in International (PCT) Application No. PCT/JP2018/016574 with English translation.
(Continued)

*Primary Examiner* — Tarifur R Chowdhury
*Assistant Examiner* — Jonathan Cook
(74) *Attorney, Agent, or Firm* — Wenderoth, Lind & Ponack, L.L.P.

(57) ABSTRACT

A clearance measurement device is a device for measuring a clearance between an inner peripheral surface of a casing and an outer peripheral surface of a rotary body. This device: emits light having a first wavelength and a second wavelength, respectively, towards the outer peripheral surface of the rotary body; receives the light reflected from the outer peripheral surface via a first filter having a transmission band corresponding to the first wavelength and via a second filter having a transmission band corresponding to the second wavelength; and measures the clearance based on a time difference of the moment to detect the rotary body.

11 Claims, 7 Drawing Sheets

(58) Field of Classification Search
CPC . F05D 2270/804; F05D 2220/30; G01L 3/12; H02K 11/22; G01C 3/08
See application file for complete search history.

(56) References Cited

U.S. PATENT DOCUMENTS

| | | | | |
|---|---|---|---|---|
| 2014/0003905 | A1* | 1/2014 | Delvaux | G01B 15/06 |
| | | | | 415/1 |
| 2015/0092039 | A1* | 4/2015 | Ruhge | G01M 15/02 |
| | | | | 348/82 |
| 2017/0112360 | A1 | 4/2017 | Tanaka et al. | |

FOREIGN PATENT DOCUMENTS

| | | |
|---|---|---|
| JP | 59-142408 | 8/1984 |
| JP | 04-30105 | 2/1992 |
| JP | 2003-254091 | 9/2003 |
| JP | 2003-270255 | 9/2003 |
| JP | 2009-168602 | 7/2009 |
| JP | 2015-001414 | 1/2015 |
| JP | 2016-17921 | 2/2016 |
| JP | 2018-036093 | 3/2018 |
| WO | 2016/069278 | 5/2016 |

OTHER PUBLICATIONS

International Preliminary Report on Patentability and Written Opinion of the International Searching Authority dated Nov. 7, 2019 in International (PCT) Application No. PCT/JP2018/016574 with English translation.
Office Action dated Jan. 26, 2021 in corresponding Japanese Patent Application No. 2017-086222, with Machine Translation.
Chinese Office Action dated Oct. 13, 2020 in corresponding Chinese Patent Application No. 201880024668.6.

* cited by examiner

CLEARANCE MEASUREMENT DEVICE, CLEARANCE MEASUREMENT SENSOR, AND CLEARANCE MEASUREMENT METHOD

TECHNICAL FIELD

The present disclosure relates to a clearance measurement device for measuring a clearance generated between an inner peripheral surface of a casing having a cylindrical shape and an outer peripheral surface of a rotary body rotating within the casing, a clearance measurement sensor which can be used for the clearance measurement device, and a clearance measurement method which can be implemented by the clearance measurement device.

BACKGROUND

A rotary machine such as a steam turbine, a gas turbine, or a turbocharger in which a rotary body rotates within a casing is known. A specified clearance is set between an inner peripheral surface of the casing and an outer peripheral surface of the rotary body rotating within the casing and it is considered to be important to maintain an appropriate value of the clearance in order to exhibit proper performance.

Patent Document 1 discloses that with a compressor which is a rotary machine, a chip clearance between rotor blades, with which a rotor is equipped, and a casing is measured by using a non-contact sensor.

CITATION LIST

Patent Literature

Patent Document 1: JP2003-254091A

SUMMARY

Technical Problem

For example, an optical sensor is used as the non-contact sensor for measuring the clearance as in Patent Document 1. For example, a marker having a different reflection factor from that of the outer peripheral surface is set on the outer peripheral surface of rotor blades, the outer peripheral surface of the rotor blade is irradiated with a laser beam emitted from optical fibers of the optical sensor, and the optical sensor detects, based on changes in an amount of reflected light, that the marker has passed a specified position. Then, passing time when the marker passes through between two different specified positions is derived based on this detection result; and the clearance between the casing and the rotor blades is calculated together with, for example, rotation time of the rotor blades.

By such an optical measurement method, the clearance is calculated based on the light reflected from the marker which is set on the outer peripheral surface of the rotor blades. The light reflected from the marker includes regular reflected light and scattered light; and as surface properties in the vicinity of the marker which is irradiated with the light change, particularly the scattered light changes and the measurement result becomes unstable, which is a factor causing measurement errors.

At least one embodiment of the present invention was devised in light of the above-described circumstances and it is an object of the invention to provide a clearance measurement device, clearance measurement sensor, and clearance measurement method capable of implementing the measurement of the clearance in the rotary machine stably and with good precision.

Solution to Problem (1) In order to solve the above-described problem, a clearance measurement device according to at least one embodiment of the present invention is a clearance measurement device for measuring a clearance generated between an inner peripheral surface of a casing having a cylindrical shape and an outer peripheral surface of a rotary body rotating within the casing, wherein the clearance measurement device includes: a first irradiation unit attached with the casing and emitting light with a first wavelength towards the outer peripheral surface of the rotary body; a second irradiation unit attached with the casing and emitting light with a second wavelength, which is different from the first wavelength, towards the outer peripheral surface of the rotary body; a first light receiving unit receiving reflected light, which corresponds to the light emitted from the first irradiation unit, from the outer peripheral surface of the rotary body; a second light receiving unit receiving reflected light, which corresponds to the light emitted from the second irradiation unit, from the outer peripheral surface of the rotary body; a first reception unit receiving the reflected light received by the first light receiving unit via a first filter unit having a transmission band corresponding to the first wavelength; a second reception unit receiving the reflected light received by the second light receiving unit via a second filter unit having a transmission band corresponding to the second wavelength; and a measurement unit measuring the clearance on the basis of a time difference between the first light receiving unit and the second light receiving unit regarding moment to detect the rotary body on the basis of a reception result of the first reception unit and the second reception unit.

According to the above-described configuration (1), the first irradiation unit and the second irradiation unit emit the light having the first wavelength and the second wavelength, respectively, towards the outer peripheral surface of the rotary body and the light reflected from the outer peripheral surface of the rotary body is received by the first light receiving unit and the second light receiving unit. The first light receiving unit receives the reflected light corresponding to the light emitted from the first irradiation unit and sends the received light via the first filter unit to the first reception unit, thereby removing components of the second wavelength included in the reflected light. The second light receiving unit receives the reflected light corresponding to the light emitted from the second irradiation unit and sends the received light via the second filter unit to the second reception unit, thereby removing components of the first wavelength included in the reflected light. Consequently, the first reception unit and the second reception unit can receive the results from which the unnecessary wavelength components included in the reflected light have been removed by the first light receiving unit and the second light receiving unit. As a result, it becomes possible to measure the clearance with good precision and stably regardless of the properties of the outer peripheral surface of the rotary body.

(2) According to some embodiments in the above-described configuration (1), the first light receiving unit and the second light receiving unit are located so that their optical axes intersect with each other on an inner surface of an isolation wall which isolates an internal space of the casing from outside; the first light receiving unit is located so as to be capable of receiving regular reflected light, which is the light emitted from the first irradiation unit, from the outer peripheral surface, and the second light receiving unit is located so as to be capable of receiving regular reflected light, which is the light emitted from the second irradiation unit, from the outer peripheral surface.

According to the above-described configuration (2), the first light receiving unit and the second light receiving unit are located in such a configuration, so that the first light receiving unit and the second light receiving unit can precisely receive regular reflection components of the light emitted from the first irradiation unit and the second irradiation unit, respectively. Since the regular reflected light components, as compared to scattered light components, can make it possible to obtain a stable measurement result regardless of the properties of the outer peripheral surface of the rotary body, thereby enabling the measurement with better precision.

(3) According to some embodiments in the above-described configuration (1) or (2), the first irradiation unit includes a first fluorescent member which is located along an optical path of the first irradiation unit and has an excitation wavelength corresponding to the first wavelength, and the second irradiation unit includes a second fluorescent member which is located along an optical path of the second irradiation unit and has an excitation wavelength corresponding to the second wavelength.

According to the above-described configuration (3), the first irradiation unit and the second irradiation unit can set the wavelength of the irradiation light to the first wavelength and the second wavelength by means of the first fluorescent member and the second fluorescent member which are located along their respective optical paths.

(4) According to some embodiments in the above-described configuration (3), light which is emitted from a common light source unit is dispersed by an optical coupler and supplied to the first irradiation unit and the second irradiation unit.

According to the above-described configuration (4), the irradiation light which has mutually different wavelengths and is emitted from the first irradiation unit and the second irradiation unit can be generated based on the light from the common light source. Such a configuration can simplify the device configuration as compared to a case where the first irradiation unit and the second irradiation unit have separate light sources.

(5) According to some embodiments in the above-described configuration (1) or (2), light which is emitted from a first light source unit and has the first wavelength is supplied to the first irradiation unit, and light which is emitted from a second light source unit and has the second wavelength is supplied to the second irradiation unit.

According to the above-described configuration (5), the first light emitting unit and the second light emitting unit have the first light source unit and the second light source unit which are independent and correspond to the first wavelength and the second wavelength, respectively, so that the clearance measurement device which has a flexible device configuration and superior reliability can be realized. Also, it is unnecessary to provide the fluorescent members for converting the wavelengths inside the device as in the above-described configuration (4), so that the internal configuration of the device can be simplified and it is also advantageous for downsizing.

(6) According to some embodiments in any one of the above-described configurations (1) to (5), the first irradiation unit, the second irradiation unit, the first light receiving unit, and the second light receiving unit are located in an internal space of the casing via an isolation wall.

According to the above-described configuration (6), the first irradiation unit, the second irradiation unit, the first light receiving unit, and the second light receiving unit are isolated by the isolation wall inside the casing with respect to the clearance which is a measurement object. Therefore, even if the clearance is placed under severe high-temperature and high-pressure conditions as in a case of a steam turbine, a gas turbine, or a turbocharger, it is possible to preferably protect the first irradiation unit, the second irradiation unit, the first light receiving unit, and the second light receiving unit and perform the measurement well.

(7) According to some embodiments in any one of the above-described configurations (1) to (6), a diffuser plate is placed along optical paths of the first irradiation unit and the second irradiation unit.

According to the above-described configuration (7), the diffuser plate is placed along the optical paths of the first irradiation unit and the second irradiation unit, so that the light emitted from the first irradiation unit and the second irradiation unit is diffused when permeating through the diffuser plate, thereby reducing variations in light distribution properties. When measuring the clearance, the irradiation light cannot be sometimes recognized well by being affected by mirror reflection caused by roughness of the outer peripheral surface, which might cause errors in the passing time of the rotary body. As this configuration has such a configuration, the mirror reflection on the surface of the rotary body which passes through the measurement area can be suppressed and the clearance can be measured accurately.

(8) According to some embodiments in any one of the above-described configurations (1) to (6), the first irradiation unit and the second irradiation unit are an optical fiber assembly including a plurality of optical fibers.

According to the above-described configuration (8), the first irradiation unit and the second irradiation unit are the optical fiber assembly including the plurality of optical fibers, so that a much wider irradiation face is obtained and it becomes possible to emit homogeneous light without using the diffuser plate as in the above-described (7).

(9) In order to solve the above-mentioned problem, a clearance measurement sensor according to at least one embodiment of the present invention is a clearance measurement sensor for detecting a clearance generated between an inner peripheral surface of a casing having a cylindrical shape and an outer peripheral surface of a rotary body rotating within the casing, wherein the clearance measurement sensor includes: a sensor body which can be attached with the casing; a first irradiation unit placed in an internal space of the sensor body and emitting light with a first wavelength towards the outer peripheral surface of the rotary body; a second irradiation unit placed in the internal space of the sensor body and emitting light with a second wavelength, which is different from the first wavelength, towards the outer peripheral surface of the rotary body; a first light receiving unit placed in the internal space of the sensor body and receiving the light reflected from the outer peripheral surface of the rotary body via a first filter unit having a transmission band corresponding to the first wavelength, and a second light receiving unit placed in the internal space of the sensor body and receiving the light reflected from the outer peripheral surface of the rotary body via a second filter unit having a transmission band corresponding to the second wavelength, wherein the first irradiation unit includes a first fluorescent member which is located along an optical path of the first irradiation unit and has an excitation wavelength corresponding to the first wavelength, and wherein the second light emitting unit includes a second fluorescent member which is located along an optical path of the second irradiation unit and has an excitation wavelength corresponding to the second wavelength.

Applying the configuration (9) to the casing and the rotary machine which rotates within the casing can preferably implement the above-mentioned clearance measurement device (including the above-described various kinds of embodiments).

(10) In order to solve the above-mentioned problem, a clearance measurement method according to at least one embodiment of the present invention is a clearance measurement method for measuring a clearance generated between an inner peripheral surface of a casing having a cylindrical shape and an outer peripheral surface of a rotary body rotating within the casing, wherein the clearance measurement method includes: a step of emitting light with a first wavelength and light with a second wavelength, which is different from the first wavelength, respectively towards the outer peripheral surface of the rotary body; a step of receiving the light reflected from the outer peripheral surface of the rotary body via a first filter unit having a transmission band corresponding to the first wavelength and via a second filter unit having a transmission band corresponding to the second wavelength; and a step of measuring the clearance on the basis of a time difference between moment to detect reflected light with the first wavelength and moment to detect reflected light with the second wavelength.

The above-described method (10) can be preferably implemented by the above-mentioned clearance measurement device (including the above-described various kinds of embodiments).

Advantageous Effects

The clearance measurement device, clearance measurement sensor, and clearance measurement method capable of implementing the measurement of the clearance in the rotary machine with good precision and stably can be provided according to at least one embodiment of the present invention.

DETAILED DESCRIPTION

Figure 1:
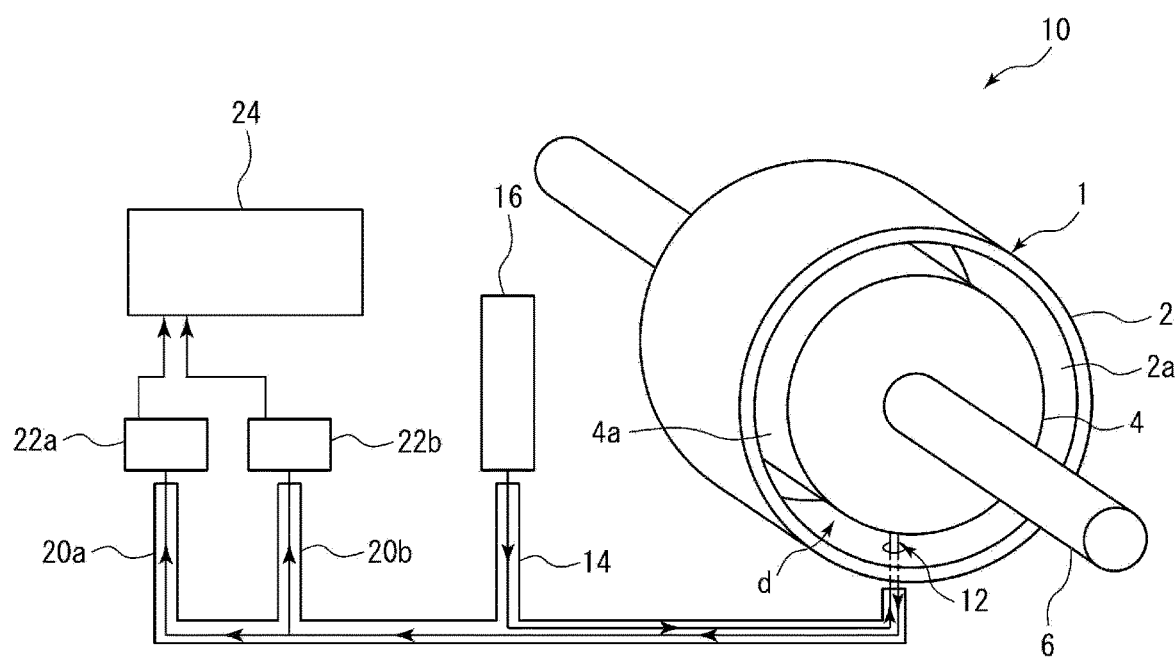
FIG. 1 is a schematic diagram illustrating an overall configuration of a rotary machine equipped with a clearance measurement device according to at least one embodiment of the present invention.

Embodiments of the present invention will now be described in detail with reference to the accompanying drawings. It is intended, however, that dimensions, materials, shapes, relative positions and the like of components described in the embodiments or illustrated in the drawings shall be interpreted as illustrative only and not limitative of the scope of the present invention.

For example, expressions representing relative or absolute positioning such as "in a certain direction," "along a certain direction," "parallel," "perpendicular to," "center," "concentric," or "coaxial" not only strictly represent such arrangement, but also represent a state where its position is relatively changed within tolerance or by an angle or distance of some degree that allows to obtain the same function.

For example, expressions representing shapes such as a quadrangular shape and a cylindrical shape not only represent the shapes of, for example, the quadrangular shape and the cylindrical shape in a geometrically strict sense, but also represent shapes including protrusions, recesses, chamfered parts, etc. within a range capable of obtaining the same effects.

On the other hand, an expression such as "comprise", "include", "have", "contain" and "constitute" are not intended to be exclusive of other components.

FIG. 1 is a schematic diagram illustrating an overall configuration of a rotary machine equipped with a clearance measurement device according to at least one embodiment of the present invention. A rotary machine 1 includes a casing 2 having a substantially cylindrical shape and a rotary body 4 rotatably placed inside the casing 2. Clearance d is provided between an inner peripheral surface 2a of the casing 2 and an outer peripheral surface 4a of the rotary body 4 and the rotary body 4 coupled to a rotation axis 6 is configured so as to be rotatable within the casing 2.

The rotary machine 1 is, for example, a steam turbine, a gas turbine, or a turbocharger. In this case, the rotary body 4 includes a plurality of rotor blades arranged and provided with a specified interval between them along a circumferential direction of the rotation axis 6; and when the rotary body 4 is activated, the outer peripheral surface 4a of the rotary body 4 is formed by these plurality of rotor blades.

The clearance measurement device 10 includes a clearance measurement sensor 12 for measuring the clearance d provided between the inner peripheral surface 2a of the casing 2 and the outer peripheral surface 4a of the rotary body 4. The clearance measurement sensor 12 is an optical sensor and is located by being attached with the casing 2 so that a detection face P (see FIG. 4) at its top end is placed opposite the outer peripheral surface 4a of the rotary body 4. When the rotary machine 1 is a steam turbine, a gas turbine, or a turbocharger, the clearance measurement sensor 12 will be exposed to the clearance d under the high-temperature and high-pressure environment between the casing 2 and the rotary body (rotor blades) 4.

The clearance measurement sensor 12 is coupled to a light source unit 16 via irradiation optical fibers 14. The light source unit 16 includes a light emitter capable of emitting the irradiation light. The light emitter is, for example, a laser beam source having a specified wavelength. The irradiation light from the light source unit 16 is sent via the irradiation optical fibers 14 to the clearance measurement sensor 12 and is emitted towards the outer peripheral surface 4a of the rotary body 4.

The irradiation light from the clearance measurement sensor 12 is reflected by the outer peripheral surface 4a of the rotary body 4 and a part of the reflected light is received by the clearance measurement sensor 12. When this happens, the reflected light from the outer peripheral surface 4a of the rotary body 4 has a specified intensity cycle depending on a shape or pattern which changes in a circumferential direction (rotation direction) of the outer peripheral surface 4a of the rotary body 4. The "shape" herein used means, for example, the shape of the rotor blades when the rotary body 4 is a turbine; and the "pattern" means, for example, a light and shade contrast produced by applying a marker (such as heat-resistant paint) with a different reflection factor from that of the outer peripheral surface 4a.

The light reflected from the outer peripheral surface 4a of the rotary body 4 is received by the clearance measurement sensor 12 and is input via a first light-receiving optical fiber 20a and a second light-receiving optical fiber 20b to a first reception unit 22a and a second reception unit 22b, respectively. The reflected light which has been input to the first reception unit 22a and the second reception unit 22b is converted into an electrical light receiving signal according to signal strength, is sent to a measurement unit 24 and is used for an arithmetic operation for the measurement of the clearance d.

The measurement unit 24 is an arithmetic unit for measuring the clearance d based on the measurement result of the clearance measurement sensor 12 and is composed of, for example, an electronic arithmetic device like a computer which uses a semiconductor device. The measurement unit 24 is configured to implement the clearance measurement device 10 according to at least one embodiment of the present invention by performing the clearance measurement method according to at least one embodiment of the present invention based on a program which is installed in advance. For example, the measurement unit 24 controls the timing to emit the irradiation light towards the outer peripheral surface 4a of the rotary body 4 by outputting a light emitting signal to the clearance measurement sensor 12 and acquires a light receiving signal corresponding to the reflected light from the outer peripheral surface 4a of the rotary body 4, thereby performing the arithmetic operation of the clearance d.

Figure 2:
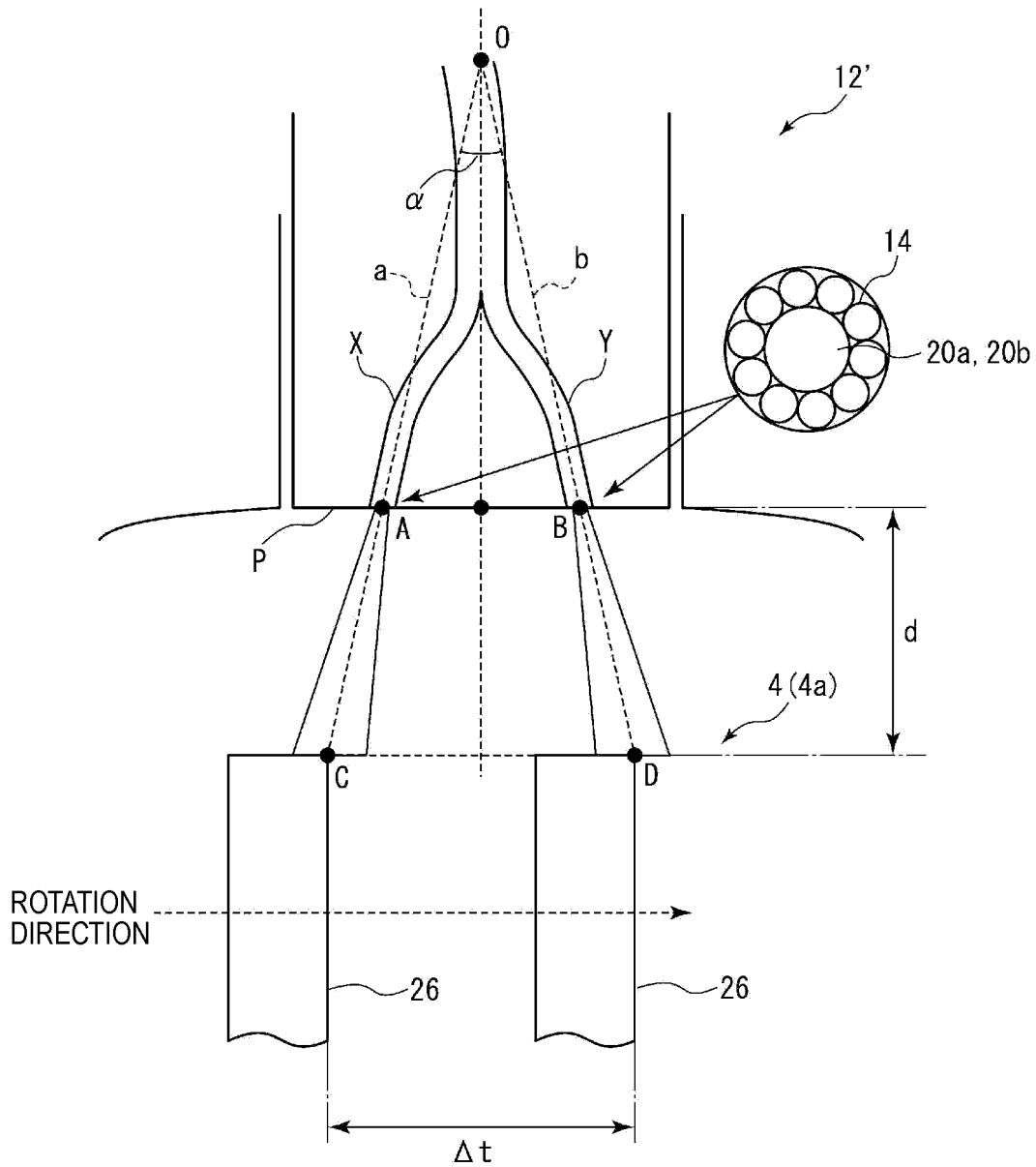
FIG. 2 is an axial sectional view of a clearance measurement sensor according to a related technology.

Now, principles for measurement of the clearance d will be explained by referring to a clearance measurement sensor according to a related technology with reference to FIG. 2. FIG. 2 is an axial sectional view of a clearance measurement sensor according to a related technology. Incidentally, regarding FIG. 2, common reference numerals will be assigned to any components corresponding to those of the clearance measurement sensor 12 according to at least one embodiment of the present invention and any redundant explanation will be omitted as appropriate.

Regarding the clearance measurement sensor according to the related technology, its detection face P is located opposite the outer peripheral surface 4a of the rotary body 4 and includes irradiation optical fibers 14 coupled to a light source unit 16, a first light-receiving optical fiber 20a coupled to a first reception unit 22a, and a second light-receiving optical fiber 20b coupled to a second reception unit 22b.

One end of each irradiation optical fiber 14 is coupled to the light source unit 16 (see FIG. 1) and an end face of the other end extends to the detection face P. The irradiation light which is emitted from the light source unit 16 is transmitted via the irradiation optical fibers 14 and is emitted from the detection face P towards the outer peripheral surface 4a of the rotary body 4.

One end of the first light-receiving optical fiber 20a is coupled to the first reception unit 22a (see FIG. 1) and an end face of the other end extends to the detection face P. The light reflected by the outer peripheral surface 4a of the rotary body 4 is received by the detection face P and is transmitted via the first light-receiving optical fiber 20a to the first reception unit 22a.

One end of the second light-receiving optical fiber 20b is coupled to the second reception unit 22b (see FIG. 1) and an end face of the other end extends to the detection face P. The light reflected by the outer peripheral surface 4a of the rotary body 4 is received by the detection face P and is transmitted via the second light-receiving optical fiber 20b to the second reception unit 22b.

Under this circumstance, the irradiation optical fibers 14 and the first light-receiving optical fiber 20a are bundled together as an optical fiber group X and a plurality of irradiation optical fibers 14 are placed around the first light-receiving optical fiber 20a. Similarly, the irradiation optical fibers 14 and the second light-receiving optical fiber 20b are bundled together as an optical fiber group Y and a plurality of irradiation optical fibers 14 are placed around the second light-receiving optical fiber 20b. These optical fiber groups X and Y extend in a substantially axial direction of the clearance measurement sensor and are placed in an inclined manner so that the separated distance between them becomes wider on their top-end side (the detection face P side). FIG. 2 shows: point A and point B which represent the end faces of the optical fiber groups X and Y, respectively; and virtual straight lines a, b which perpendicularly pass through the end faces at point A and point B. FIG. 2 also shows an intersection point O of the virtual straight lines a, b as a reference point for the clearance measurement sensor; and a crossing angle between the virtual straight lines a, b at the intersection point O is indicated as $\alpha$.

Incidentally, the optical fiber group X, Y is composed of the plurality of optical fibers as described above; however, in FIG. 2, the plurality of optical fibers are collectively considered as one point as point A or point B at the position of the top end face of the optical fibers X, Y. Also, FIG. 2 illustrates rotor blades 26 which form the outer peripheral surface 4a by taking, as an example, a case where the rotary body 4 is a turbine. Under this circumstance, point C is a point where a corner of the rotor blade 26 on its outside end face (a front-side corner in the rotation direction among two corners) intersects with the virtual straight line a; and point D is a point where the corner of the rotor blade 26 on its outside end face (the front-side corner in the rotation direction among the two corners) intersects with the virtual straight line b.

Figure 3:
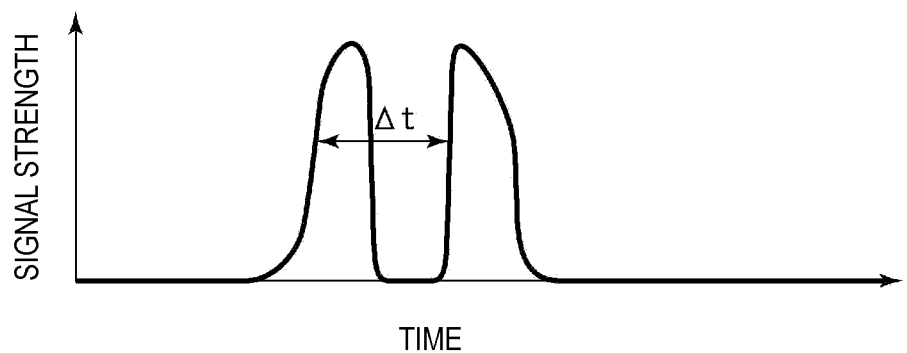
FIG. 3 is a graph regarding signal strength of a light receiving signal which is input from the clearance measurement sensor in FIG. 2 to a measurement unit.

Each of such optical fiber groups X, Y emits the irradiation light from the end face of the irradiation optical fibers 14 towards the outer peripheral surface 4a and the first light-receiving optical fiber 20a and the second light-receiving optical fiber 20b receive that reflected light. FIG. 3 is a graph regarding signal strength of a light receiving signal which is input from the clearance measurement sensor in FIG. 2 to a measurement unit. In FIG. 3, the horizontal axis represents time and the vertical axis represents signal strength.

Regarding the light receiving signal, two signal peaks corresponding to time $\Delta t$ required for a measurement point (the front-side corner of the rotor blade in the rotation direction) on the outer peripheral surface 4a of the rotary body 4 to move from point C to point D are detected as illustrated in FIG. 3. In this example, the clearance d is calculated according to the following expression where T represents a rotation period of the rotary body 4 and R represents a radius of the rotary body 4.

[Math 1]

$$d = \frac{\frac{1}{2}\overline{CD}}{\tan\frac{\alpha}{2}} - \frac{\frac{1}{2}\overline{AB}}{\tan\frac{\alpha}{2}} = \frac{\frac{1}{2} \times 2\pi R \times \frac{\Delta t}{T}}{\tan\frac{\alpha}{2}} - \frac{\frac{1}{2}L}{\tan\frac{\alpha}{2}} \quad (1)$$

Accordingly, the clearance measurement sensor according to the related technology detects the time $\Delta t$ required for the outer peripheral surface $4a$ of the rotary body 4 to move from point C to point D and calculates the clearance d according to the above-mentioned expression (1). Therefore, it is required to detect the time $\Delta t$ with good precision and stably in order to detect the clearance d with good precision. Through the inventors' ardent studies, it has been found that if the surface properties in the vicinity of irradiation area of the irradiation light change, the measurement result of the light reflected from the outer peripheral surface $4a$ of the rotary body 4 becomes unstable, which may become a factor causing measurement errors. In light of the above-described problem, the inventors have devised a clearance measurement device capable of measuring the clearance with good precision and stably by reducing the influence of the surface properties in the vicinity of the light irradiation area.

First Embodiment

Figure 4:
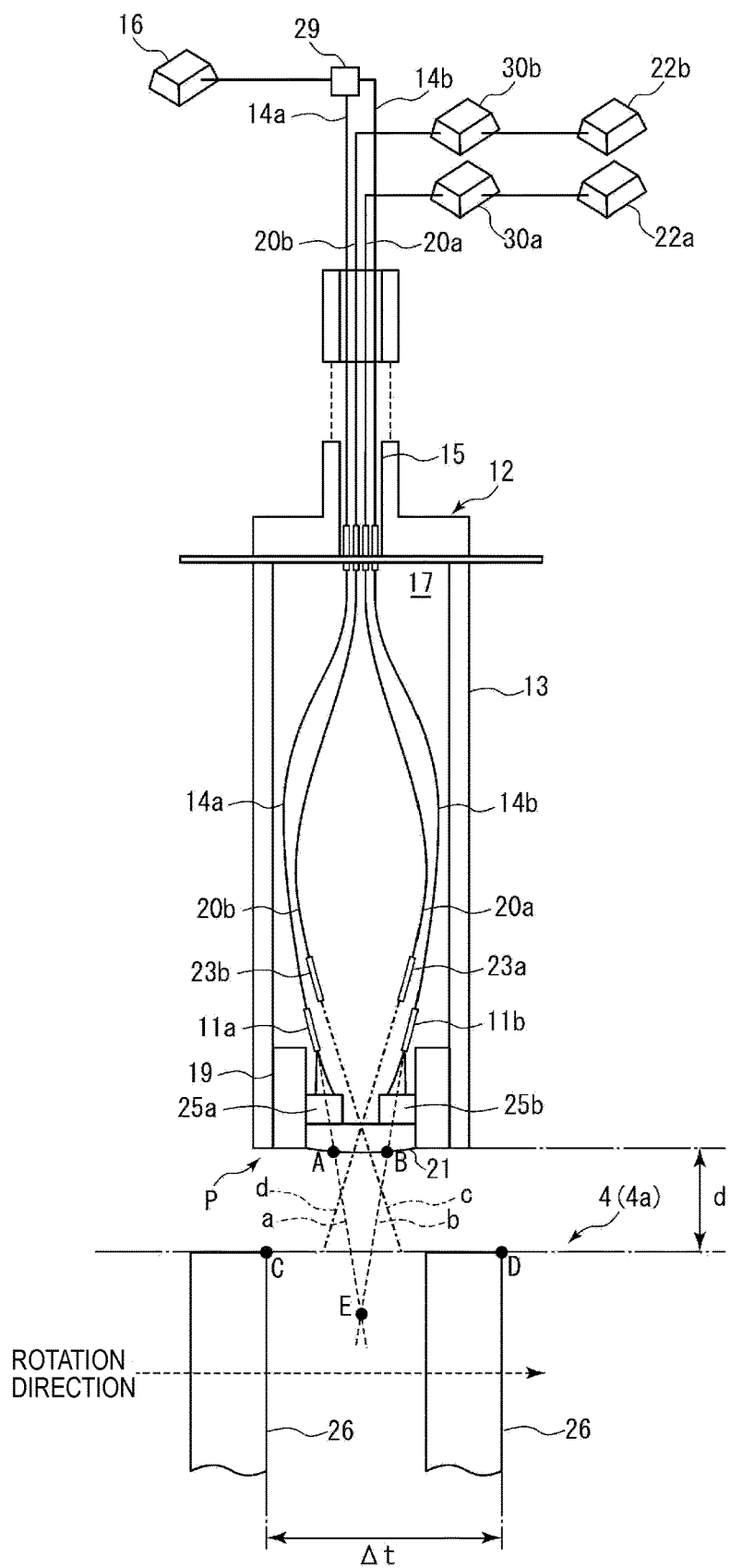
FIG. 4 is a sectional view schematically illustrating an internal structure of a clearance measurement sensor according to a first embodiment.

FIG. 4 is a sectional view schematically illustrating an internal structure of a clearance measurement sensor 12 according to a first embodiment. The clearance measurement sensor 12: is located so that the detection face P is placed opposite the outer peripheral surface $4a$ of the rotary body 4; and includes a first irradiation optical fiber $14a$ and a second irradiation optical fiber $14b$ which are coupled to a light source unit 16, and a first light-receiving optical fiber $20a$ and a second light-receiving optical fiber $20b$ which are coupled to a first reception unit $22a$ and a second reception unit $22b$, respectively.

The clearance measurement sensor 12 has a sensor body 13 of a substantially cylindrical shape. The first irradiation optical fiber $14a$, the second irradiation optical fiber $14b$, the first light-receiving optical fiber $20a$, and the second light-receiving optical fiber $20b$ are introduced from a first opening 15 provided on one end side of the sensor body 13 into its internal space 17. The respective top ends of the first irradiation optical fiber $14a$, the second irradiation optical fiber $14b$, the first light-receiving optical fiber $20a$, and the second light-receiving optical fiber $20b$ which are introduced into the internal space 17 are located towards a second opening 19 provided on the other end side of the sensor body 13.

The second opening 19 is closed with an isolation wall 21 made of a permeable material and the internal space 17 is isolated from the clearance d. Therefore, even when the clearance d is in a severe high-temperature and high-pressure environment, the respective optical fibers placed in the internal space 17 are protected precisely and good reliability is secured.

Incidentally, examples of the permeable material used for the isolation wall 21 include diamonds, sapphires, and so on.

One end of each of the first irradiation optical fiber $14a$ and the second irradiation optical fiber $14b$ is coupled to the light source unit 16 (see FIG. 1) and an end face of the other end is located in the internal space 17 of the sensor body 13. A first irradiation unit $11a$ and a second irradiation unit $11b$ for emitting the irradiation light transmitted from the light source unit 16 are provided respectively on irradiation-side top ends of the first irradiation optical fiber $14a$ and the second irradiation optical fiber $14b$.

A first light receiving unit $23a$ and a second light receiving unit $23b$ are located in the internal space 17 so that their optical axes c, d intersect with each other on the inside surface of the isolation wall 21. The first irradiation unit $11a$ and the first light receiving unit $23a$ are located so that the light emitted from the first irradiation unit $11a$ becomes fluorescently luminous at a fluorescent member $25a$ and the regular reflected light from the outer peripheral surface can be received by the first light receiving unit $23a$. The second irradiation unit $11b$ and the second light receiving unit $23b$ are located so that the light emitted from the second irradiation unit $11b$ becomes fluorescently luminous at a fluorescent member $25b$ and the regular reflected light from the outer peripheral surface can be received by the second light receiving unit $23b$. As a result, the first irradiation unit $11a$ and the second irradiation unit $11b$ according to the present embodiment have a bilaterally symmetrical (optically symmetric) arrangement.

The first fluorescent member $25a$ and the second fluorescent member $25b$ are located respectively on the optical axes a, b of the irradiation light which is emitted from the first irradiation unit $11a$ and the second irradiation unit $11b$. The first fluorescent member $25a$ and the second fluorescent member $25b$ produce excitation light having a first wavelength $\lambda 1$ and a second wavelength $\lambda 2$, respectively, by being excited by the irradiation light which is emitted from the first irradiation optical fiber $14a$ and the second irradiation optical fiber $14b$. Under this circumstance, the first wavelength $\lambda 1$ and the second wavelength $\lambda 2$ are visible light bands and are mutually different wavelengths. The excitation light from the first fluorescent member $25a$ and the second fluorescent member $25b$ permeate through the isolation wall 21 and is emitted towards the outer peripheral surface $4a$ of the rotary body 4.

Incidentally, the first fluorescent member $25a$ and the second fluorescent member $25b$ are located in the internal space 17 inside the isolation wall 21 so that they are separated from each other with a distance between them to a degree allowing the light reflected from the outer peripheral surface $4a$ of the rotary body 4 to pass through without interfering with the first fluorescent member $25a$ and the second fluorescent member $25b$. Consequently, it is possible to avoid the influence on the light reflected from the outer peripheral surface $4a$ of the rotary body 4 and convert the wavelength of each irradiation light appropriately.

Incidentally, the present embodiment is designed so that light which is emitted from the common light source unit 16 is dispersed by an optical coupler 29 and the dispersed light is supplied to the first irradiation optical fiber $14a$ and the second irradiation optical fiber $14b$ and its wavelength is converted to the first wavelength $\lambda 1$ and the second wavelength $\lambda 2$, respectively, by the first fluorescent member $25a$ and the second fluorescent member $25b$ provided in the clearance measurement sensor 12. Consequently, one light source unit 16 is enough, so that the external configuration of the clearance measurement sensor 12 can be simply configured.

One-side ends of the first light-receiving optical fiber 20a and the second light-receiving optical fiber 20b are coupled to the first reception unit 22a and the second reception unit 22b, respectively, (see FIG. 1) and the other ends are located in the internal space 17. It is configured so that the first light receiving unit 23a and the second light receiving unit 23b for receiving the light reflected from the outer peripheral surface 4a are provided at their ends on the internal space 17 side and the reflected light which is received by the first light receiving unit 23a and the second light receiving unit 23b is transmitted respectively via the first light-receiving optical fiber 20a and the second light-receiving optical fiber 20b to the first reception unit 22a and the second reception unit 22b.

The first light receiving unit 23a and the second light receiving unit 23b: are located at positions capable of receiving the reflected light which permeates through the isolation wall 21; and are particularly located as described above so that their optical axes c, d intersect with each other on the inner surface of the isolation wall 21. Consequently, the first light receiving unit 23a is located at the position capable of receiving the regular reflected light from the outer peripheral surface, which is the light emitted from the first irradiation unit 11a as described earlier; and the second light receiving unit 23b is located at the position capable of receiving the regular reflected light from the outer peripheral surface, which is the light emitted from the second irradiation unit 11b. As a result, in the present embodiment, the first light receiving unit 23a and the second light receiving unit 23b have a bilaterally symmetrical (optically symmetric) arrangement and are inclined so that the separated distance between them becomes narrower towards the second opening 19.

The first irradiation unit 11a, the second irradiation unit 11b, the first light receiving unit 23a, and the second light receiving unit 23b are located in the internal space 17 in the above-described positional relationship, so that the reflected light which is the irradiation light from the first irradiation unit 11a is received by the first light receiving unit 23a and the reflected light which is the irradiation light from the second irradiation unit 11b is received by the second light receiving unit 23b.

With the related technology explained earlier with reference to FIG. 2, the geometric positional relationship between the respective optical fibers enables the second light-receiving optical fiber 20b to receive the regular reflected light components, while the first light-receiving optical fiber 20a cannot receive the regular reflected light components and results in mainly receiving the scattered light components of the reflected light. Through the inventors' ardent studies, as the surface properties in the vicinity of the irradiation area of the irradiation light change, the scattered light components of the reflected light tend to easily become unstable, which may become the factor causing measurement errors.

Contrarily, in the present embodiment, the first irradiation unit 11a, the second irradiation unit 11b, the first light receiving unit 23a, and the second light receiving unit 23b are located in the above-mentioned positional relationship, so that both the first light receiving unit 23a and the second light receiving unit 23b are configured to be capable of receiving the regular reflected light components. Therefore, the stable measurement result is obtained regardless of the surface properties in the vicinity of the irradiation area and it becomes possible to measure the clearance with less measurement errors and with high precision.

Furthermore, with this type of the clearance measurement sensor, as the detection face P is exposed to the high-temperature and high-pressure environment, thermal expansion may occur and the separated distance L between point A and point B may sometimes change. The present embodiment can reduce the separated distance L between point A and point B as compared to the related technology. Therefore, regarding the above-mentioned expression (1), the term "$-(\frac{1}{2})L/\tan(\alpha/2)$" including the separated distance L can be reduced, thereby making it possible to enhance the measuring precision.

The first light-receiving optical fiber 20a and the second light-receiving optical fiber 20b include a first filter unit 30a and a second filter unit 30b, respectively, between the first reception unit 22a and the second reception unit 22b. The first filter unit 30a and the second filter unit 30b have transmission bands corresponding to the first wavelength $\lambda 1$ and the second wavelength $\lambda 2$, respectively.

The reflected light received by the first light receiving unit 23a includes, in addition to the regular reflected light components which are the main target having the first wavelength $\lambda 1$ from the first irradiation unit 11a, only a little amount of the scattered light components having the second wavelength $\lambda 2$ from the second irradiation unit 11b. Such scattered light components having the second wavelength $\lambda 2$ become noise components for the first reception unit 22a and become the factor to increase the measurement errors. Therefore, the first filter unit 30a is used so that such unnecessary scattered light components can be removed by filtering. Consequently, the first reception unit 22a can extract the regular reflected light components which are the main target having the first wavelength $\lambda 1$ and are the irradiation light from the first irradiation unit 11a, and good measuring precision can be obtained.

Similarly, the reflected light received by the second light receiving unit 23b includes, in addition to the regular reflected light components which are the main target having the second wavelength $\lambda 2$ from the second irradiation unit 11b, only a little amount of the scattered light components having the first wavelength $\lambda 1$ from the first irradiation unit 11a. Such scattered light components having the first wavelength $\lambda 1$ become noise components for the second reception unit 22b and become the factor to increase the measurement errors. Therefore, the second filter unit 30b is used so that such unnecessary scattered light components can be removed by filtering. Consequently, the second reception unit 22b can extract the regular reflected light components which are the main target having the second wavelength $\lambda 2$ and are the irradiation light from the second irradiation unit 11b, and good measuring precision can be obtained.

Figure 5:
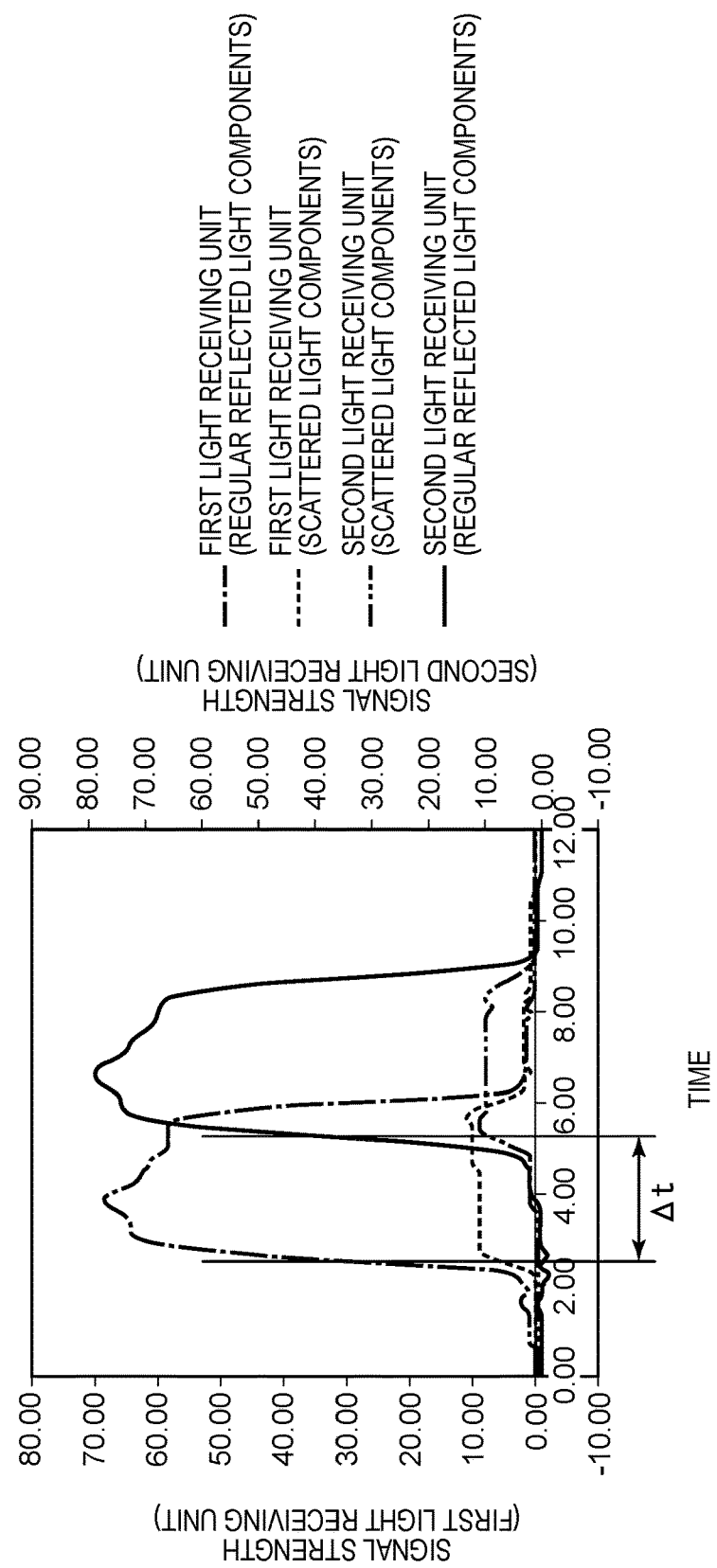
FIG. 5 is an example of a measurement result of a light receiving signal which is input to a measurement unit in FIG. 4.
Figure 6:
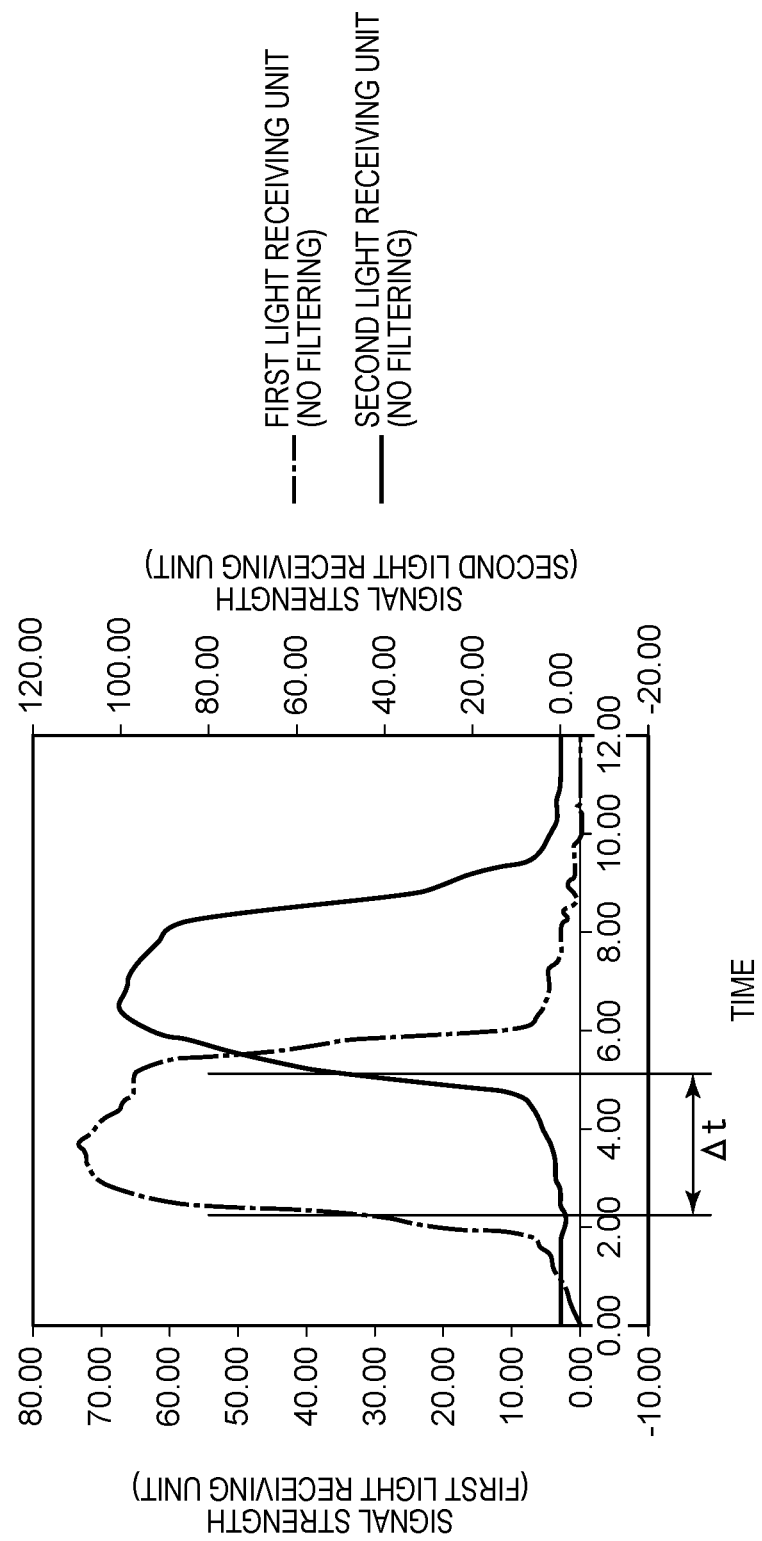
FIG. 6 is a comparative example of FIG. 5.

FIG. 5 is an example of a measurement result of a light receiving signal which is input to the measurement unit 24 in FIG. 4; and FIG. 6 is a comparative example of FIG. 5. In the present embodiment as illustrated in FIG. 5, the first reception unit 22a and the second reception unit 22b perform separated detection for the first wavelength $\lambda 1$ and the second wavelength $\lambda 2$, respectively, so that the light receiving signal had less distortions in waveforms and the waveforms regarding both the reception units had similar results. This shows that the outer peripheral surface 4a of the rotary body 4 was recognized accurately and, therefore, the clearance can be measured with good precision.

On the other hand, the comparative example in FIG. 6 shows the measurement of the light receiving signal based on the results of the light reception from the first light receiving unit 23a and the second light receiving unit 23b at the first reception unit 22a and the second reception unit 22b without the intermediary of the first filter unit 30*a* and the second filter unit 30*b*. In this case as compared to FIG. 5, the measured waveforms have distortions and the waveforms regarding both the reception units resulted in considerably different waveforms. As is apparent from the comparison between the measurement results in FIG. 5 and FIG. 6, it has been verified that in the present embodiment, the first reception unit 22*a* and the second reception unit 22*b* can implement the detection with good precision by having the first filter unit 30*a* and the second filter unit 30*a* perform filtering.

According to the present embodiment as described above, the outer peripheral surface 4*a* of the rotary body 4 is irradiated with the irradiation light having the first wavelength λ1 and the irradiation light having the second wavelength λ2, respectively, and the filtering processing corresponding to the first wavelength λ1 and the second wavelength λ2 is executed on the received reflected light. Consequently, the time Δt can be measured well regardless of the properties of the irradiation face; and as a result, the clearance d can be measured with good precision and stably.

Second Embodiment

Figure 7:
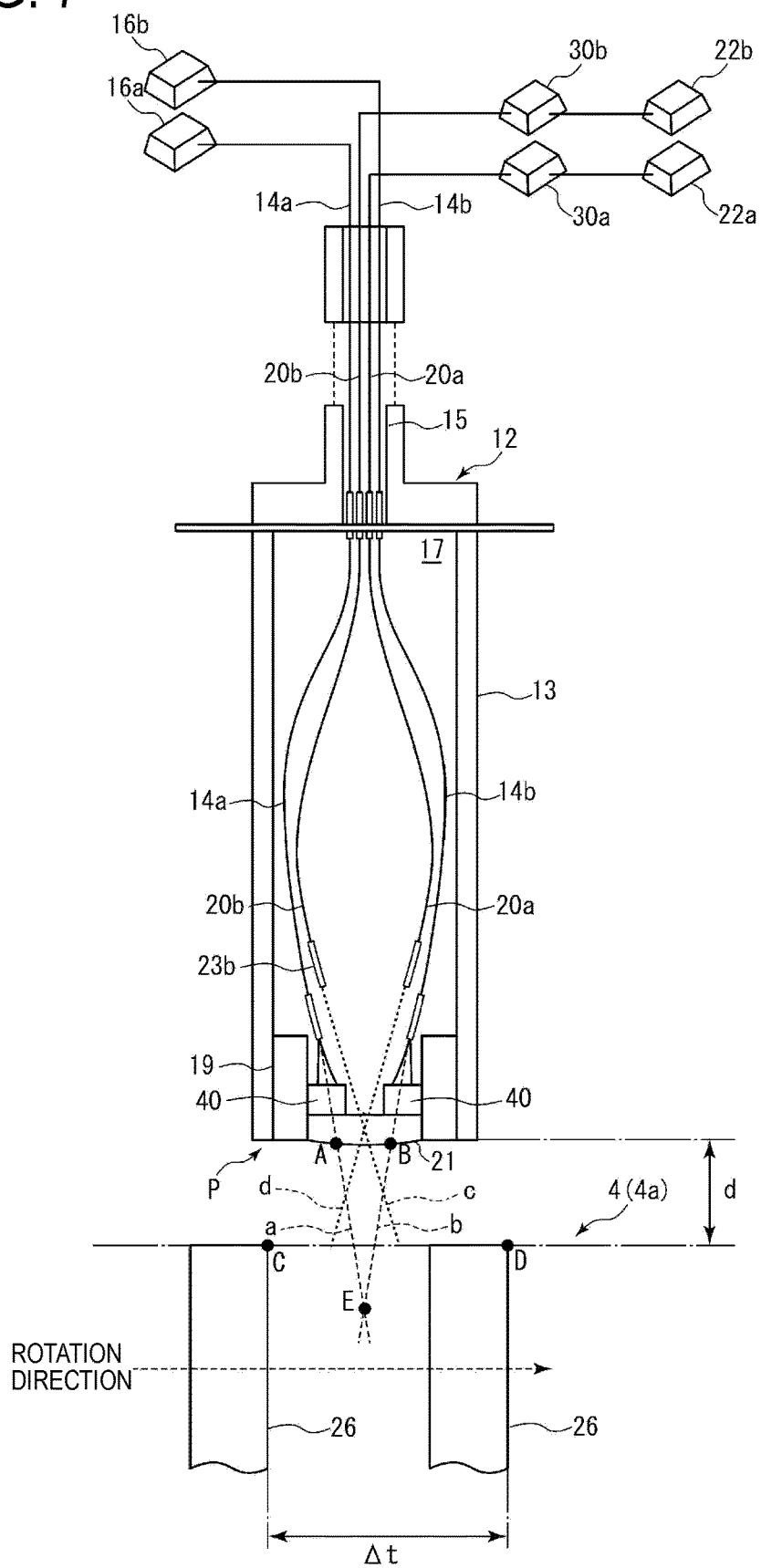
FIG. 7 is a sectional view schematically illustrating an internal structure of a clearance measurement sensor according to a second embodiment.

Subsequently, the clearance measurement sensor 12 according to a second embodiment will be explained. FIG. 7 is a sectional view schematically illustrating an internal structure of the clearance measurement sensor according to the second embodiment. Incidentally, in the following explanation, common reference numerals are assigned to components corresponding to the above-mentioned embodiment and any redundant explanation will be omitted.

The difference between the second embodiment and the above-mentioned first embodiment is that in the second embodiment, the first irradiation optical fiber 14*a* and the second irradiation optical fiber 14*b* which are introduced into the sensor body 13 of the clearance measurement sensor 12 have two independent first light source unit 16*a* and second light source unit 16*b*. The first light source unit 16*a* and the second light source unit 16*b* are light sources which emit irradiation light having the first wavelength λ1 and the second wavelength λ2, respectively.

The irradiation light having the first wavelength λ1, which has been emitted from the first light source unit 16*a*, is transmitted via the first irradiation optical fiber 14*a* and is emitted from the first irradiation unit 11*a*. The irradiation light emitted from the first irradiation unit 11*a* is homogenized by a diffuser plate 40 located on its optical path, passes through the isolation wall 21 made of the permeable material, and irradiates the outer peripheral surface 4*a* of the rotary body 4. Then, the light reflected from the outer peripheral surface 4*a* of the rotary body 4 is received by the first light receiving unit 23*a*, passes through the first light-receiving optical fiber 20*a* and then the first filter unit 30*a*, and is detected by the first reception unit 22*a*.

The irradiation light having the second wavelength λ2, which has been emitted from the second light source unit 16*b*, is transmitted via the second irradiation optical fiber 14*b* and is emitted from the second irradiation unit 11*b*. The irradiation light emitted from the second irradiation unit 11*b* is homogenized by the diffuser plate 40 located on its optical path, passes through the isolation wall 21 made of the permeable material, and irradiates the outer peripheral surface 4*a* of the rotary body 4. Then, the light reflected from the outer peripheral surface 4*a* of the rotary body 4 is received by the second light receiving unit 23*b*, passes through the second light-receiving optical fiber 20*b* and then the second filter unit 30*b*, and is detected by the second reception unit 22*b*.

Accordingly, the second embodiment has the two independent first light source unit 16*a* and second light source unit 16*b*, so that the irradiation light having the first wavelength λ1 and the second wavelength λ2 can be emitted without locating the first fluorescent member 25*a* and the second fluorescent member 25*b* in the internal space 17 of the sensor body 13 as in the first embodiment. Therefore, the sensor structure can be simplified and it is also advantageous for downsizing.

Third Embodiment

Figure 8:
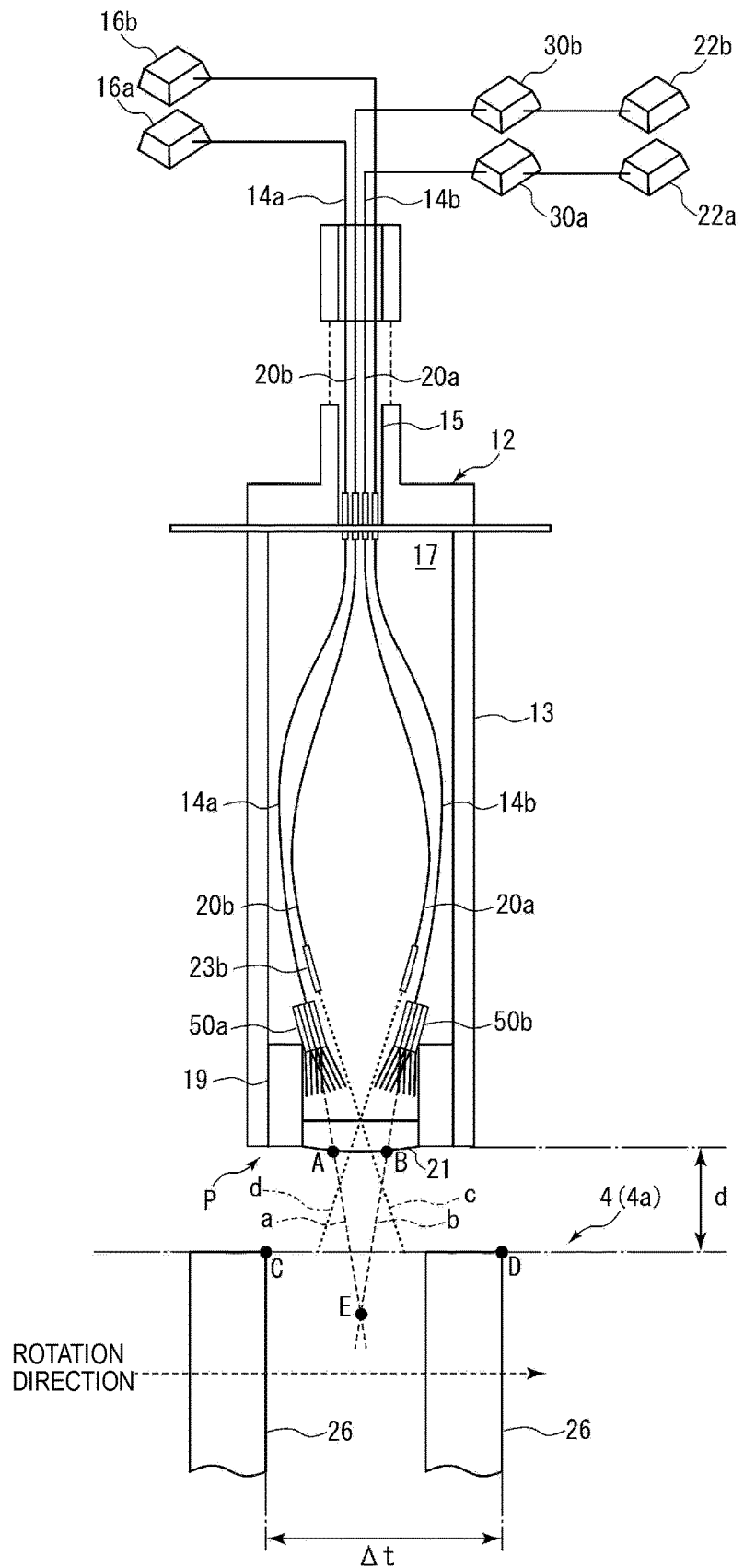
FIG. 8 is a sectional view schematically illustrating an internal structure of a clearance measurement sensor according to a third embodiment.

Subsequently, the clearance measurement sensor 12 according to a third embodiment will be explained. FIG. 8 is a sectional view schematically illustrating an internal structure of the clearance measurement sensor according to the third embodiment. Incidentally, in the following explanation, common reference numerals are assigned to components corresponding to the above-mentioned embodiment(s) and any redundant explanation will be omitted.

The difference between the third embodiment and the above-mentioned second embodiment is that in the third embodiment, the first irradiation unit 11*a* and the second irradiation unit 11*b* provided at the top ends of the first irradiation optical fiber 14*a* and the second irradiation optical fiber 14*b* which are introduced into the sensor body 13 of the clearance measurement sensor 12 are respectively an optical fiber assembly 50*a* including a plurality of optical fibers.

The first irradiation optical fiber 14*a* introduces the irradiation light, which has been emitted from the first light source unit 16*a*, into the internal space of the sensor body 13 and emits the irradiation light from the optical fiber assembly 50*a* provided at its top end towards the outer peripheral surface 4*a*. The optical fiber assembly 50*a* is a bundle of the plurality of optical fibers and is configured so as to be capable of dispersing the irradiation light, which has been transmitted by the first irradiation optical fiber 14*a*, and emitting the dispersed irradiation light. Therefore, the optical fiber assembly 50*a* makes it possible to obtain a much wider irradiation face and emit the homogeneous light without locating the diffuser plate 40 in the internal space 17 as in the second embodiment.

Similarly, the second irradiation optical fiber 14*b* introduces the irradiation light, which has been emitted from the second light source unit 16*b*, into the internal space of the sensor body 13 and emits the irradiation light from the optical fiber assembly 50*b* provided at its top end towards the outer peripheral surface 4*a*. The optical fiber assembly 50*b* is a bundle of the plurality of optical fibers and is configured so as to be capable of dispersing the irradiation light, which has been transmitted by the second irradiation optical fiber 14*b*, and emitting the dispersed irradiation light. Therefore, the optical fiber assembly 50*b* makes it possible to obtain a much wider irradiation face and emit the homogeneous light without locating the diffuser plate 40 in the internal space 17 as in the second embodiment.

According to the present embodiment explained above, the homogeneous irradiation light can be emitted and the clearance can be measured with good precision without including the diffuser plate 40 in the internal space 17.

Therefore, the configuration of the clearance measurement sensor 12 can be simplified and it is also advantageous for downsizing.

INDUSTRIAL APPLICABILITY

The present disclosure can be used for the clearance measurement device for measuring the clearance generated between the inner peripheral surface of the casing having the cylindrical shape and the outer peripheral surface of the rotary body rotating within the casing, the clearance measurement sensor which can be used for the clearance measurement device, and the clearance measurement method which can be implemented by the clearance measurement device.

REFERENCE SIGNS LIST 1 rotary machine
2 casing
4 rotary body
6 rotation axis
10 clearance measurement device
12 clearance measurement sensor
13 sensor body
14 irradiation optical fibers
15 first opening
16 light source unit
19 second opening
20 light-receiving optical fibers
21 isolation wall
22 reception unit
24 measurement unit
25 fluorescent member
26 rotor blade
29 optical coupler
30 filter unit
40 diffuser plate
50 optical fiber assembly

The invention claimed is:

1. A clearance measurement device for measuring a clearance generated between an inner peripheral surface of a casing having a cylindrical shape and an outer peripheral surface of a rotary body rotating within the casing,
the clearance measurement device comprising:
a first irradiator attached with the casing and emitting light with a first wavelength towards the outer peripheral surface of the rotary body;
a second irradiator attached with the casing and emitting light with a second wavelength, which is different from the first wavelength, towards the outer peripheral surface of the rotary body;
a first light receiver receiving the light reflected from the outer peripheral surface of the rotary body via a first filter unit having a transmission band corresponding to the first wavelength;
a second light receiver receiving the light reflected from the outer peripheral surface of the rotary body via a second filter unit having a transmission band corresponding to the second wavelength; and
a measurement unit measuring the clearance on the basis of a difference between an amount of time needed for the first light receiver to detect the rotary body and an amount of time needed for the second light receiver to detect the rotary body,
wherein the first light receiver is located so as to be capable of receiving regular reflected light, which is the light emitted from the first irradiator, from the outer peripheral surface, and
wherein the second light receiver is located so as to be capable of receiving regular reflected light, which is the light emitted from the second irradiator, from the outer peripheral surface.

2. The clearance measurement device according to claim 1,
wherein the first light receiver and the second light receiver are located so that their optical axes intersect with each other on an inner surface of an isolation wall which isolates an internal space of the casing from outside.

3. The clearance measurement device according to claim 1,
wherein the first irradiator includes a first fluorescent member which is located along an optical path of the first irradiator and has an excitation wavelength corresponding to the first wavelength, and
wherein the second irradiator includes a second fluorescent member which is located along an optical path of the second irradiator and has an excitation wavelength corresponding to the second wavelength.

4. The clearance measurement device according to claim 3, wherein light which is emitted from a common light source unit is dispersed by an optical coupler and supplied to the first irradiator and the second irradiator.

5. The clearance measurement device according to claim 1,
wherein light which is emitted from a first light source unit and has the first wavelength is supplied to the first irradiator, and
wherein light which is emitted from a second light source unit and has the second wavelength is supplied to the second irradiator.

6. The clearance measurement device according to claim 1, wherein the first irradiator, the second irradiator, the first light receiver, and the second light receiver are located in an internal space of the casing via an isolation wall.

7. The clearance measurement device according to claim 1, wherein a diffuser plate is placed along optical paths of the first irradiator and the second irradiator.

8. The clearance measurement device according to claim 1, wherein the first irradiator and the second irradiator are an optical fiber assembly including a plurality of optical fibers.

9. A clearance measurement sensor for detecting a clearance generated between an inner peripheral surface of a casing having a cylindrical shape and an outer peripheral surface of a rotary body rotating within the casing,
the clearance measurement sensor comprising:
a sensor body which can be attached with the casing;
a first irradiator placed in an internal space of the sensor body and emitting light with a first wavelength towards the outer peripheral surface of the rotary body;
a second irradiator placed in the internal space of the sensor body and emitting light with a second wavelength, which is different from the first wavelength, towards the outer peripheral surface of the rotary body;
a first light receiver placed in the internal space of the sensor body and receiving the light reflected from the outer peripheral surface of the rotary body via a first filter unit having a transmission band corresponding to the first wavelength; and
a second light receiver placed in the internal space of the sensor body and receiving the light reflected from the outer peripheral surface of the rotary body via a second filter unit having a transmission band corresponding to the second wavelength, wherein the first irradiator includes a first fluorescent member which is located along an optical path of the first irradiator and has an excitation wavelength corresponding to the first wavelength, wherein the second irradiator includes a second fluorescent member which is located along an optical path of the second irradiator and has an excitation wavelength corresponding to the second wavelength, wherein the first light receiver is located so as to be capable of receiving regular reflected light, which is the light emitted from the first irradiator, from the outer peripheral surface, and wherein the second light receiver is located so as to be capable of receiving regular reflected light, which is the light emitted from the second irradiator, from the outer peripheral surface.

10. A clearance measurement method for measuring a clearance generated between an inner peripheral surface of a casing having a cylindrical shape and an outer peripheral surface of a rotary body rotating within the casing, the clearance measurement method comprising:

emitting light with a first wavelength and light with a second wavelength, which is different from the first wavelength, respectively towards the outer peripheral surface of the rotary body;

receiving regular reflected light of the light reflected from the outer peripheral surface of the rotary body via a first filter unit having a transmission band corresponding to the first wavelength and via a second filter unit having a transmission band corresponding to the second wavelength; and measuring the clearance on the basis of a difference between an amount of time needed for detecting reflected light of the light with the first wavelength to detect the rotary body and an amount of time needed for detecting reflected light of the light with the second wavelength to detect the rotary body.

11. The clearance measurement device according to claim 3, wherein the first fluorescent member and the second fluorescent member are located apart from each other with a distance between them so that the light reflected from the outer peripheral surface can pass through without interfering with the first fluorescent member or the second fluorescent member.

* * * * *